Figure 1:

Oct. 4, 1960     OLE-BENDT RASMUSSEN     2,954,587

METHOD OF PRODUCING FIBROUS MATERIALS

Filed May 23, 1955

Ole-Bendt Rasmussen

United States Patent Office 2,954,587
Patented Oct. 4, 1960

2,954,587

METHOD OF PRODUCING FIBROUS MATERIALS

Ole-Bendt Rasmussen, Copenhagen, Denmark. (Bilbergs Minde, Taarbaek Strandvej 144, Klampenborg, Denmark)

Filed May 23, 1955, Ser. No. 510,509

Claims priority, application Denmark May 29, 1954

5 Claims. (Cl. 18—47.5)

The present invention relates to an improved method of producing fibrous materials, for instance for textiles.

It has been proposed to produce textile fibres from thin films of polyvinyl chloride, afterchlorinated polyvinyl chloride, or polystyrene. The film is first uniaxially oriented and then split up by brushing it, twisting it or working it frictionally. In this way there will be formed sharp edged and fine fibres or threads, because the mentioned materials exhibit a very marked cleavableness when oriented. The orientation is carried out by stretching the films to a multiple of their original length while in the thermoelastic state, and then fixing the stretch by cooling the extended material. The apparatus and working processes are much simpler than in the ordinarily used methods for making fibrous materials.

However, fibres which are prepared in accordance with this proposed method prove to be unsuitable for use in textiles. The sharp edged form in connection with the high cleavableness of the fibres result in a very low wearing resistance, and furthermore the sharp edges are irritating to the tissues of the skin.

Now I have found that fibrous materials may be prepared without these faults if crystalline superpolymerisates are used instead of materials like polyvinyl chloride, afterchlorinated polyvinyl chloride, and polystyrene. The crystalline superpolymerisate is split up by some suitable disintegration process after having been subjected to a highly orienting stretching process, which may be carried out either as a drawing process or as a compressive stretching and either cold or warm. The disintegration will only be successful if the conditions are such that the material is prevented from rearranging its orientation under the influence of the disintegrating forces. Furthermore I have found that fibres produced in accordance with this present invention exhibit several advantages in comparison to fibres formed by the ordinarily used extrusion processes, as will be described below.

It is well known that a crystalline superpolymerisate will become a fibrillar microstructure when oriented. Simplifying the facts a little, one may say that the oriented material consists of parallel crystalline fibrils suspended in an amorphous matrix. The thickness of the fibres is generaly about one to a few microns. Each fiber is composed of a very large number of crystallites. The amorphous matrix is softer than the crystalline fibrils, and I have proved that a disintegrating treatment will tend to provoke the break in the amorphous interspaces. Because of this the splitting up will follow the microstructure of the oriented material and thus yield fibres without sharp edges.

The disintegration is preferably carried out so that the crystalline microstructure is exposed totally or at least to a very high degree, without splitting or breaking the single fibres notably. The fibres prepared in that way are not sensitive to wearing, because the crystalline sections exhibit a low cleavableness.

Polyvinylchloride, afterchlorinated polyvinyl chloride and polystyrene do not form a fibrillar structure as described when oriented, but remain homogeneous down to the molecular level. It is known that X-ray diagrams of those oriented materials show but little crystallinity, and the materials are not classified as crystalline superpolymerisates. To give a precise description of the present invention, the term "crystalline superpolymerisate" as used here refers to those superpolymerisates which, by orientation, can be given a microstructure consisting of crystalline fibrils separated by less crystalline spaces. Of course the invention is not limited to the use of pure crystalline superpolymerisates but also comprises the addition of a non-crystalline component, if this component is added in an amount which does not disturb the mentioned microstructure.

Nylon is especially well suited as a material for carrying out the invention. By nylon is meant as usual any fiberforming superpolymerisate containing an essential amount of peptide bonds. However any crystalline superpolymerisate may be used, and other examples are polyvinylene chloride, polyethylene and crystalline polyterephthalates.

The tensile strength of fibres which are prepared in accordance with the present invention is similar to the strength of the fibres which are produced from the same substance by the ordinary extrusion process, followed by an orientation by drawing, and in several other respects they are superior to the ordinarily produced fibres. An important improvement is that their tendency to become electrostatically charged is much lower. One reason for this is probably that the surface is less hydrophobic, due partly to the amorphous coating which the fibres acquired because the disintegration has followed the amorphous spaces, and partly to the formation of hydrophilic groups at the points where molecular chains are broken during the disintegration. Furthermore there may occur some discharging from the irregularities at the surface. Another important improvement is that the frictional bonding between the single fibres in a twisted yarn and between the yarns in a woven textile is better when the fibres are prepared in accordance with the present invention, because this yields fibres with a rough surface. However, the surface is not so rough that it irritates the skin tissues. Finally textiles produced from the fibres of the present invention are less heat conducting than textiles from ordinary fibres of the same chemical substance and of a similar thickness. This is probably also due to the roughness of the surface.

It is a simplification to describe the structure of the oriented crystalline superpolymerisates as composed of parallel, crystalline, fibrillar regions and an amorphous matrix. In reality the crystalline fibrils are more or less infiltrated and twisted into each other and even have direct interconnections. Neither the crystallinity nor the amorphousness is absolute, and the delineation of the regions is not absolutely sharp. In the present invention it is however usually preferable to carry out the orientation in a way which impresses a structure upon the material which is a good approximation to the idealized representation. As is well known this can be obtained by stretching the material while it is in a melted or semimelted state, or while it is in the form of a viscous solution. If the orientation is done in the last way an annealing is recommended to increase the crystallinity, after the solvent has been removed. If the orientation is done by cold stretching, a structure will result which is more different from the idealisation. However a cold stretching is preferred in some special embodiments of the invention, especially if it is intended to produce a material in which a very marked interconnection should be retained between the fibres, so that the fibrous structure tends to degenerate into a highly porous structure.

Several well known processes and apparatuses may be applied for carrying out the orientation. This can for instance be done in direct succession to an extrusion, while the material is still semimelted.

To facilitate the disintegration it is advisable to give the material the form of a thin foil or film. However, the invention can also be carried out on a material which has been given another form. For example attempts to use relatively thick filaments have given good results.

Usually it is preferable to make the processes work continuously, forming the material, orienting it and feeding it into the disintegration equipment as an unbroken band.

It has already been mentioned that difficulties have been found to arise from a tendency of the oriented crystalline superpolymerisate to rearrange its orientation under the influence of the forces which should split up the material by drawing the fibrils from each other. This tendency must either be eliminated during the disintegration process, or some special disintegration treatment must be used which restricts the freedom of the material to alter its extension. If a rearrangement of the orientation is allowed, the splitting up will be impossible, or at least the quality of the fibres will be bad.

To eliminate this tendency to alter the orientation, one may for instance carry out the disintegration at a very low temperature, at which the orientation is "frozen down." However, the preferred method in accordance with the invention is to treat the oriented material with a softening agent during or before the disintegration process. The softening agent may either be a liquid or a gas. I have found that the reorienting tendency can be completely eliminated if the material is swelled or highly softened by a suitable treatment. Furthermore, a suitable softening treatment will make the disintegration forces decrease very much, without essentially affecting the strength in the direction of orientation. After removing the softener the strength in this direction need not to be affected at all. Even if the softening agent is removed before the disintegration, the tendency of reorientation has often proved to be very much decreased, and the cleavableness is thus improved.

The choice of a suitable softening agent and of the conditions during the softening treatment is related to the material to be treated and to the special conditions of the whole procedure, but one who is skilled in the art may easily decide this on the basis of simple experiments. As an example it should be mentioned that oriented bands of polyethylene have been split up after being passed through a bath of cyclohexanone at 80° C. The disintegration was carried out at room temperature, while the material was still swelled. Another example is that mixtures of formic acid and alcohol at room temperature can be used for the softening treatment of oriented polycaprolactam.

In most cases it is advisable to elute the softener after the disintegration instead of evaporating it, because the fibres may otherwise be bonded together.

The softening treatment can make the material shrink in the direction of orientation, but this seems to have no influence on the cleavableness. The shrinkage may be eliminated by a renewed stretching, after the softening agent has been removed, and it may be avoided by keeping the material suspended in the direction of orientation while under the influence of the softener.

The disintegration treatment may be carried out in many different ways. One method which has proved to be very successful is to provoke the splitting up by means of an acoustic field. The acoustic waves are preferably applied to the bath of softener through which the oriented material is passed. It may be preferred to support it during the passage, for instance to hold it between two endless net-formed or highly porous moving bands.

The frequency and the intensity of the waves must be chosen in relation to the superpolymerisate, to the film thickness, the degree of softening, and to the desired character of the fibres, but one skilled in the art can easily arrange the acoustic treatment on the basis of experiments. As already mentioned, it is generally preferred to expose most of the internal structure of the oriented material, without splitting or breaking the fibrils. Furthermore one should avoid an extraction of the amorphous regions, which may occur under the influence of the sonics. It seems that the most suitable frequencies are those from audible to about 100 kilocycles.

The splitting up may either be carried out in such a way as to form single fibres, or a greater or smaller coherence may be conserved between the fibres, which in this way will form a net-work. A net-work form material is advantageous for instance for yarns, because it facilitates the preparation of the yarn and makes the coherence better.

The splitting up may also be produced by frictional work, similar to what is known from the above mentioned proposal concerning fiberformation from polyvinylchloride and related substances. The disintegration has furthermore been carried out rather successfully by means of a hammer mill, and by causing a swelling agent in the oriented material to evaporate violently, while the material is pressed between two supports, thus forcing the fibrils from each other.

However, the invention is not limited to any special disintegration process, nor is a softening treatment indispensable. The invention may also be carried out by means of equipment in which the orientation and the disintegration processes are combined into one single working process, although the two stages are really distinct when the conditions in the treated material are considered. Equipment of this kind should preferably use compressive stretching.

Figure 2:
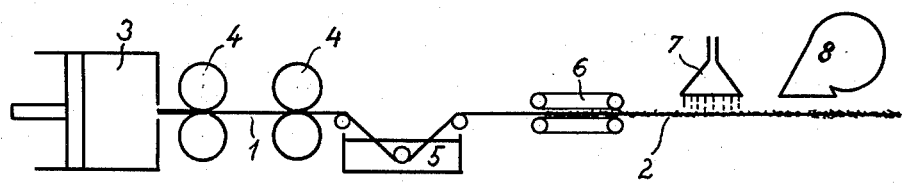
Figure 3:
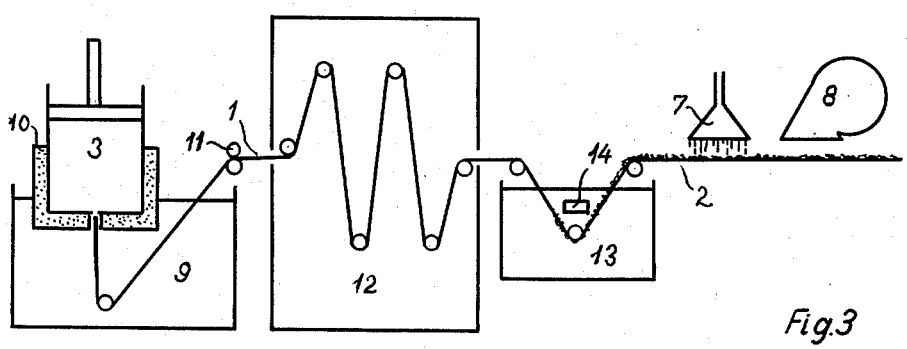
Figure 4:
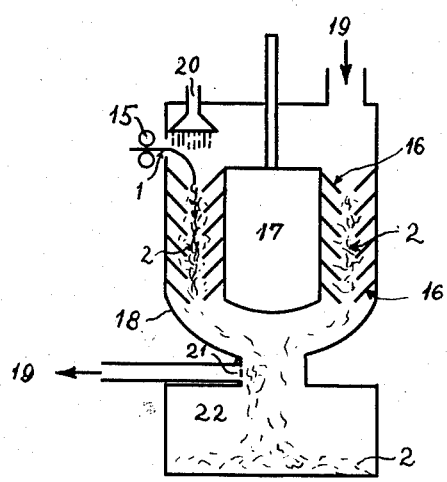

The invention is illustrated on the accompanying drawing, of which Fig. 1 is a flow-sheet representing the principle of the method, Fig. 2 and Fig. 3 are cross-sectional side views of two different embodiments, shown very schematically, and Fig. 4 is a cross-sectional side view of a hammer mill which may replace the disintegration apparatus on Figs. 2 and 3.

On Fig. 1, 1 is the intact and 2 the up-split body. The body 1 is preferably but not necessarily continuous. It is generally a wide or narrow, thin band, but may also be a relatively thick filament of any profile. The steps of moulding and orientation may be combined into one single step, and the swelling agent may be applied in the disintegration equipment.

Fig. 2 illustrates an embodiment in which the moulding and the orientation are separate steps. An extruder 3 moulds a thin band 1, which is passed through an ordinary drawing equipment 4, consisting of two sets of rollers run at different peripheral speeds. The drawing may be carried out cold, or in many cases in the semi-molted state. The band 1 is seen in its smallest dimensions. 1 may also represent a relatively thick filament. In succession to the orientation the continuous body 1 is passed through a swelling bath 5 and a frictionally working disintegrator 6. The former may be substituted by a brush wetted by the swelling agent, or by a spraying device. The latter consists of two endless bands of rough surfaces, which are sliding forward and backward towards each others in the directions perpendicular to the paper, and at the same time carrying the body. 7 is a washing and 8 a drying equipment.

On Fig. 3 the moulding and the orientation are combined into one step and carried out in the molted or semi-molted state. 1 still represents a thin band seen in its smallest dimensions or a relatively thick filament. The continuous body 1 is extruded into a cooling bath 9, which makes it congeal. The bath is separated from the extruder 3 by a heat-insulating material 10. The body 1 is drawn from the extruder at a relatively high speed by means of a set of rollers 11 and passed through an oven 12, in which the crystallinity is increased. After this the splitting-up is effected by passage through the swelling bath 13, to which acoustic waves are applied from the generator 14. Washing and drying as on Fig. 2.

The frictional disintegration shown on Fig. 2 may substitute the acoustic treatment in the process illustrated on Fig. 3, and further this acoustic treatment may usually be applied on bodies oriented as on Fig. 2. In any case cutting apparatus may be inserted in the process before the proper disintegrator.

In case the up-split material 2 is not coherent, carrying bands are used.

A hammer mill as the one shown on Fig. 4 may also substitute the acoustic or frictional disintegrators. The body 1, which must in this case be a thin foil, is fed to the mill by a set of rollers 15 and disintegrated between the rods 16, which are fixed on the rotating cylinder 17 and the house 18.

The material is carried by a stream of air shown by the arrows 19 and the swelling agent may be applied to the foil in the mill by a spraying device 20. The staple fibres 2 are separated from the air by the filter 21 and fall into the collector 22.

What I claim is:

1. A method of producing fibrous materials which comprises highly molecularly orienting a film unidirectionally while the material is in a viscous-fluid state, said film being composed of a normally crystalline superpolymerisate, permitting the material to solidify, subsequently fixing the direction of the crystals by swelling the film by means of a liquid swelling agent, and finally splitting up the oriented and swelled film substantially in the direction of orientation into a plurality of fibers by forces having a stretching component perpendicular to the direction of orientation.

2. The method of claim 1, in which the superpolymerisate is nylon.

3. The method of claim 1, in which the splitting up is carried out by means of acoustical forces.

4. The method of claim 1, in which the splitting up is carried out by means of frictional forces.

5. The method of claim 1, in which the splitting up is carried out by means of a hammer mill.

References Cited in the file of this patent

UNITED STATES PATENTS

| | | |
|---|---|---|
| 2,336,100 | Jacque | Dec. 7, 1943 |
| 2,545,869 | Bailey | Mar. 20, 1951 |
| 2,614,288 | Chavannes | Oct. 21, 1952 |
| 2,707,805 | Smith et al. | May 10, 1955 |
| 2,728,950 | Annesser | Jan. 3, 1956 |

FOREIGN PATENTS

| | | |
|---|---|---|
| 718,588 | Great Britain | Nov. 17, 1954 |